June 19, 1962 P. E. STOYER ETAL 3,039,186
METHOD OF FORMING A JOINT BETWEEN THE RAIL AND RUNG OF A LADDER
Filed Aug. 6, 1957 3 Sheets-Sheet 1
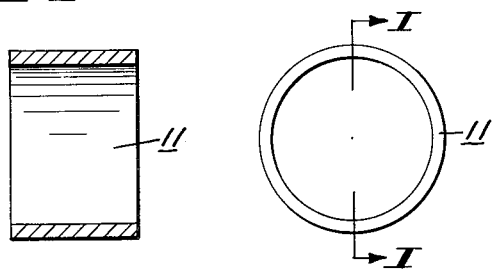
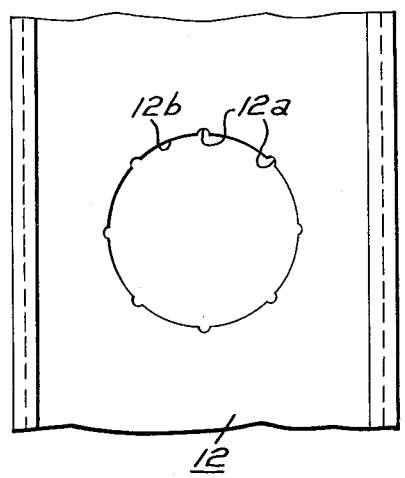
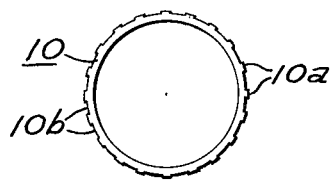
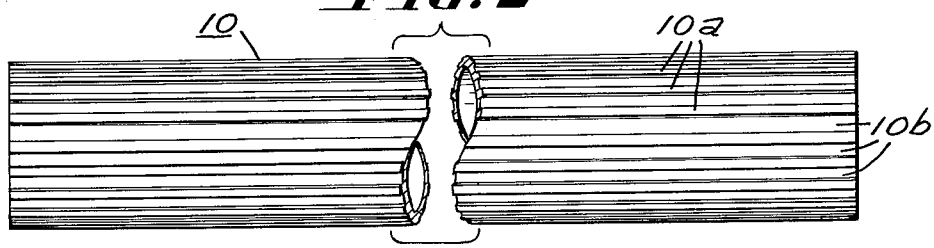
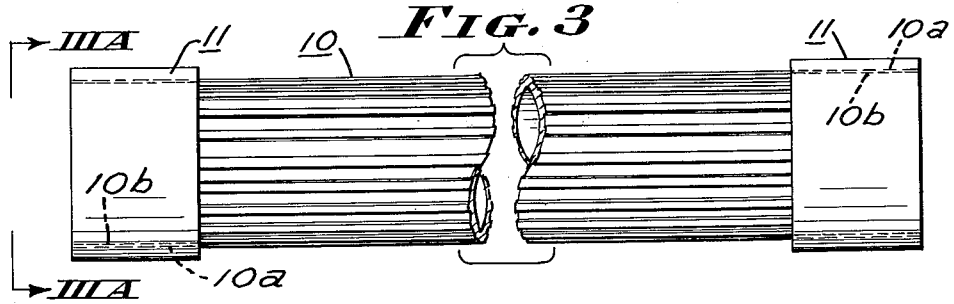
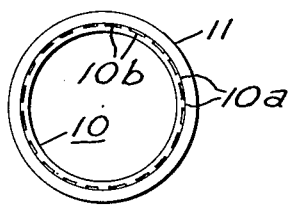
INVENTORS:
PAUL E. STOYER and
HENRY E. VALLIQUETTE
BY:
THEIR ATTORNEYS.

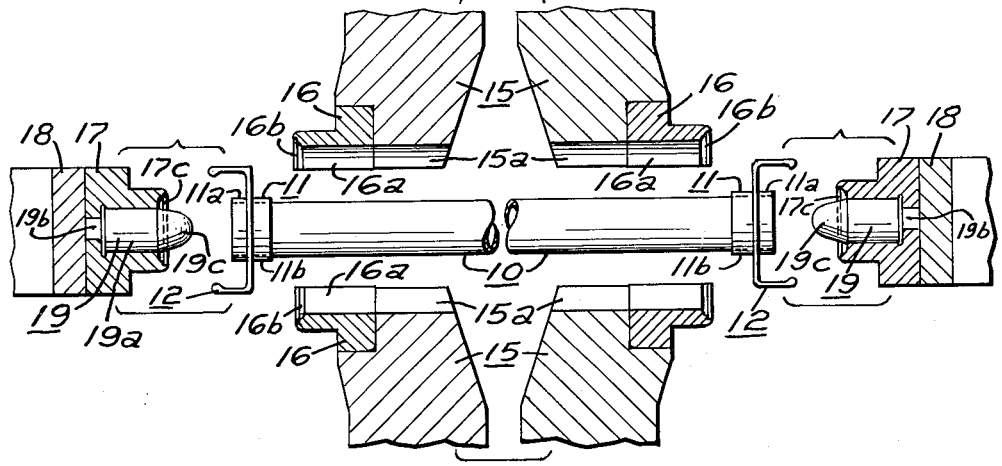
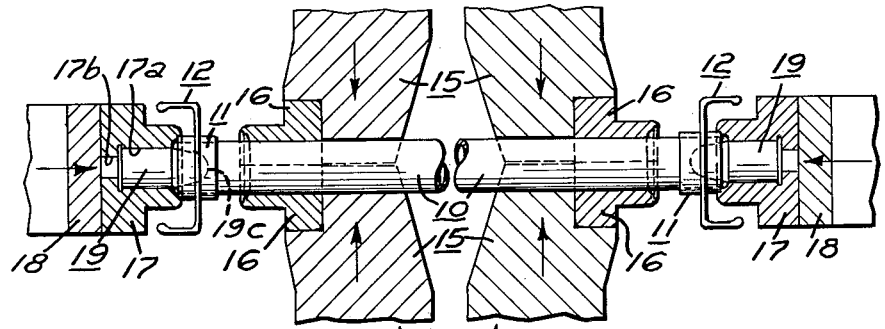
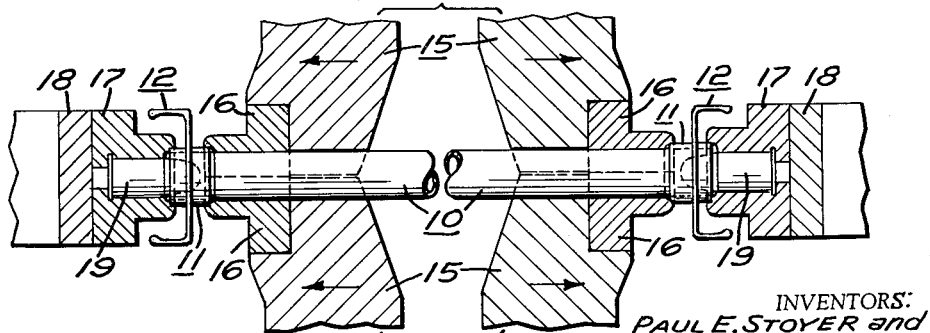

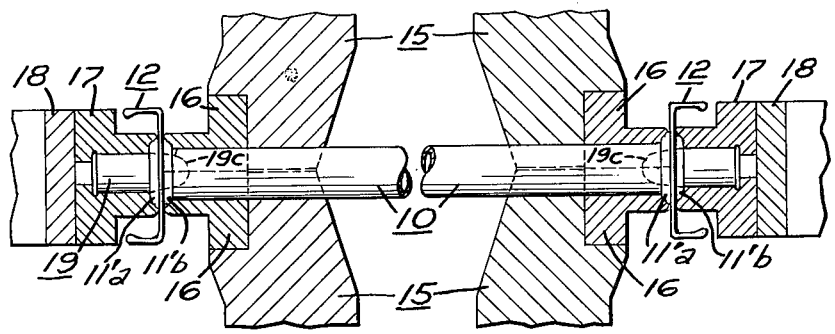
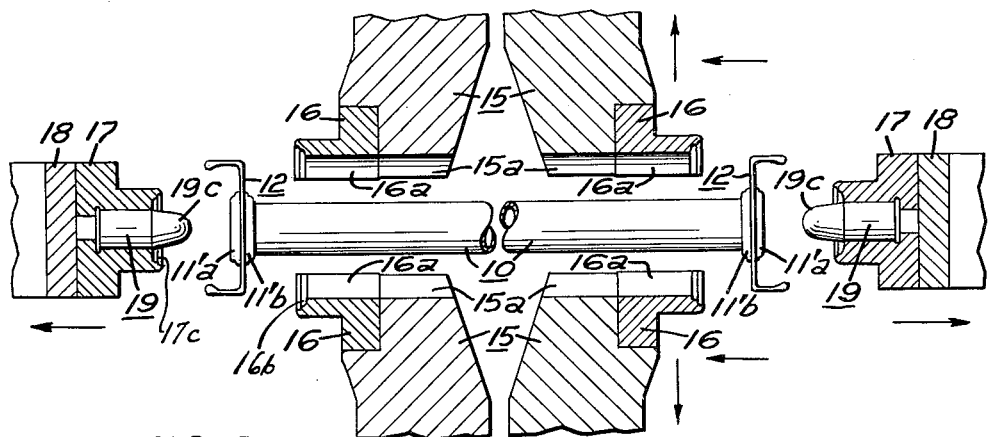
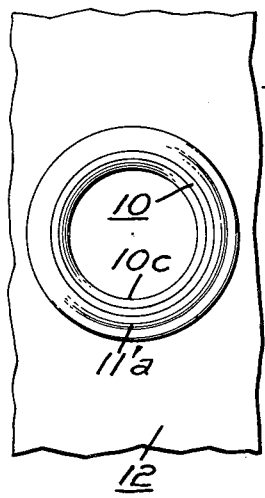

United States Patent Office 3,039,186
Patented June 19, 1962

3,039,186
METHOD OF FORMING A JOINT BETWEEN THE RAIL AND RUNG OF A LADDER
Paul E. Stoyer, Greenville, and Henry E. Valliquette, Kittanning, Pa., assignors to R. D. Werner Co. Inc., Greenville, Pa., a corporation of Pennsylvania
Filed Aug. 6, 1957, Ser. No. 676,613
6 Claims. (Cl. 29—520)

This invention relates to a ladder construction and particularly, to an improved metal ladder construction. The invention particularly pertains to the field of joining ladder rungs and side rails where such parts are of a metal that may be extruded or swaged, such as aluminum and its alloys.

A phase of the invention deals with an improved procedure for assembling and unitizing or joining a rung and a side rail with respect to each other.

Previous to our present invention, various types of rung and side rail assemblies have been tried in connection with metal ladder constructions. In this connection, the problem applies particularly to ladders, such as extension ladders which have rungs of a more or less rounded or cylindrical shape. The problem is complicated by the difficulty of accomplishing a securing or joining operation as between members that are normally assembled in a perpendicular or a right-angular relationship with respect to each other, at least one of whose members is of tubular or rounded form, and in addition, that have to support considerable weight, and withstand rack, fracture, twisting torque, etc.

Welded joints have not been successful due to the nature of light metals and the danger of burned and weakened areas. Other types employed include a so-called flared, expanded and staked joint; and expanded and flared gusset plate type; a swaged and riveted gusset plate type; an upset, expanded and staked type; an expanded and flared type; and, a dual interposed member type. However, none of these have fully met the need for a stronger light metal ladder that may be used in greater lengths, as in a two, three, etc. section extension ladder.

The need has been for an improved ladder or joint manufacture or procedure that will provide a product having better strength qualities to meet the more exacting present-day requirements and for stronger and longer ladders.

It has thus been an object of our invention to develop or produce a ladder joint construction and method of manufacture that will meet the problem and particularly, one that will provide a product having superior torque and rack qualities;

Another object of our invention has been to develop criteria for the construction of an improved metal ladder joint, such that if failure occurs, it will, for example, be in the rung section rather than in the joint itself;

A further object has been to develop a ladder construction employing a somewhat soft and extrudable metal such as aluminum and its alloys, magnesium, etc., that will make possible an extension or broadening of the field of application or usage of a so-called lightweight ladder construction;

These and other objects of our invention will appear to those skilled in the art from the drawings and the descriptive embodiment thereof.

In the drawings, FIGURE 1 is a side section taken along the line I—I of FIGURE 1A and illustrating a ferrule part or banding sleeve employed in our construction;

FIGURE 1A is an end view of the part or sleeve of FIGURE 1;

FIGURE 2 is a fragmental side view in elevation, on the scale of FIGURES 1 and 1A, and illustrating a hollow or tubular ladder rung part or member employed in our construction;

FIGURE 2A is a view on the scale of and taken endwise of the rung part or member of FIGURE 2;

FIGURE 3 is a side view on the scale of FIGURE 2 that shows the part or sleeve of FIGURES 1 and 1A in an end-assembled, preliminary, positioned relation on each end portion of the rung part or member of FIGURE 2;

FIGURE 3A is an end view on the scale of and taken along the line IIIA—IIIA of FIGURE 3;

FIGURE 4 is an outside fragmental view in elevation of a portion of a side rail that is pierced or provided with a rung-receiving open portion; this view is on the same scale as FIGURES 1 to 3A, inclusive.

FIGURES 5 to 9, inclusive, are reduced side views in elevation illustrating procedure involved in making or processing a highly efficient and secure integration of side rail and rung parts with an interposed ferrule or banding part; in these figures, we have shown centrally-disposed, separable or split dies that define upper and lower opposed pairs or endwise-opposed pairs and which cooperate with a pair of endwise-outwardly positioned pilot dies; relative movement is employed to effect our procedure and the resultant product of FIGURE 10;

FIGURE 10 is a side fragment in section and elevation, on the scale of FIGURES 1 to 4, inclusive, of an end joint or integrated rung and side rail construction produced in accordance with our invention;

And FIGURE 10A is an end view on the scale of, taken along the line XA—XA of, and turned 90 degrees with respect to FIGURE 10;

To summarize briefly, our invention involves the utilization of three parts or members in a highly improved or a stress-and-strain-resistant integration or joint assembly. The parts or members include a ferrule, banding element, or sleeve part or member 11; a serrated, lengthwise-extending, cross rung member or part 10, and suitable side rails. The latter are provided in pairs of vertical or longitudinal members 12 between which the rungs 10 are to extend transversely and at suitable longitudinally or vertically-spaced intervals.

To attain a superior torque resistant construction or joint, we have determined that only one intermediate part or member 11 is necessary or desirable and that it can be made fully effective, not only as a joining member, but as a strengthening or reinforcing portion of the joint. We provide pierced edge portions or bounding edge walls 12b that define openings within the side rails 12 that have circumferentially or peripherally spaced-apart, transversely-extending, radially-outwardly offset, female, notched or grooved portions 12a. It is important that the grooved portions 12a represent total areas that are a relatively small portion of the total area or inside curvature of the edge wall 12b of the opening or pierced portion. In other words, the principal or major diameter of 12b represents a greater cylindrical extent than the curved extent of the grooved portions 12a, as exemplified by the fact that the spacing between the grooved portions or notches 12a is relatively great and the notches have a much shorter extent than the portions 12b.

On the other hand, as shown in FIGURE 2A, the serrated outer surface or radially-offset portions of the rung 10 have a much greater frequency or relative number of male portions, pips or teeth 10a than the grooves 12a of the side rails 12. Although the outer cylindrical or major peripheral portions 10b predominate in area over the teeth portions 10a of the rung member 10, the predominance is much less in the case of the outer surface of the rung 10, than in the case of the bounding surface 12b and the groove portions 12a of open portions in the side rails 12.

In the first step of joint assembly, ferrules 11 are slid on the ends to be joined (in the case of FIGURE 3) on opposite ends of the rung 10. In this connection, the inner diameter of the ferrules 11 is slightly smaller than the outer diameter represented by the teeth 10a, so as to provide a slight or a slide-on tightness of frictional fit between the two members or parts 10 and 11 (see FIGURE 3A).

In the next step of the operation, the preliminary assembly of FIGURE 3 is aligned in a suitable position (see FIGURE 5) with respect to forming die members. The machine or assembly may consist, as shown, of horizontally-split pairs of centrally-disposed heads or gripping jaws 15 that are adapted to be operated independently in such a manner that they, in effect, provide upper and lower pairs or opposed end pairs for gripping the assembly 10 and 11 and for holding it in an aligned relationship with a pair of solid pilot or end dies 17 during joint-forming procedure (see FIGURE 6). This is accomplished by moving the upper and lower pairs of jaws 15 and their die sections 16 vertically or radially-inwardly towards each other (see the arrows of FIGURE 6) while simultaneously moving the pilot dies 17 endwise-inwardly into a positioning engagement with opposite end portions of the rung and ferrule assembly.

Next (as shown in FIGURE 7), now-gripping and centrally-disposed dies (now closed) 16 may be moved endwise-outwardly, while simultaneously exerting an endwise holding force on the pilot dies 17, so that (as shown in FIGURES 7 and 8) the ferrules 11 are first endwise gripped and are then endwise swaged within opposed end cavities 16b and 17c (see FIGURE 9) of dies 16 and 17. Thus, the cavity 17c provides a swaging die face in the outer end of the pilot die 17 and corresponding die cavity 16b of the closed pair of inset die pieces or members 16 provides an opposed swaging die face.

It will be noted that inner bore segments or portions 16a of the die pieces 16 are of substantially the same inner diameter as bore portions 15a of the heads or jaws 15 within which they are carried. Each solid end or pilot die 17 may have, as shown, an outer knock-out bore 19b of relatively small diameter and a large forward, substantially cylindrical, pilot-receiving bore 17a. Pilot piece, part or element 19 fits within the bore 17a to project forwardly from front cavity 17c and has a forwardly-rounded, tip-entry, end portion 19c. As shown particularly in FIGURE 6, the end portion 19c enters with a progressive swaging action into engagement within the inner diameter of the end portion of the rung member 10, and immediately beneath the ferrule 11. This relationship of the tip 19c to the end of the rung 10 and with respect to the ferrule 11 is maintained throughout the joining or integrating operation (see FIGURES 6, 7 and 8).

As shown particularly in FIGURE 8, the ferrule 11 is, in effect, equally or uniformly swaged or pressure-flowed endwise to form the joint by, for example, moving end-opposed central heads 15 in a gripping relation endwise-outwardly with respect to each other. Upon completion of the forming or assembling operation, the dies 17 may be moved endwise backwardly, the central heads 15 may be moved endwise-inwardly and, in addition, the latter may be moved radially-outwardly with relation along their split sections (see FIGURE 9) to release the completed assembly 10, 12.

FIGURE 10 illustrates the type of joint that is produced, as well as the type of processing that is employed in effecting a joint in accordance with our invention. It is important that the fillet or banding part 11 be given a major or greater radially-outwardly-offset depth or thickness and a relatively minor radially-inner-upset or grooving-in-effect on the end portion of the rung 10. This is clearly represented by the now integrated portion 11' of FIGURE 10. Also exemplified in such figure, is the equal endwise-inner and outer compression flow or distribution of rim metal 11'a and 11'b on either side of the side rail member 12. As shown in FIGURE 10A, there is a full filling-up of the grooved portions of the serrated inner and outer diameters, respectively, of the open portion of the side rail 12 and of the end portion of the rung 10. This serration-enclosing flow, however, is greater radially-inwardly between teeth 10a of the rung 10 than radially-outwardly into the grooves 12a, because as previously pointed out, the greater amount of serrating or of offsetting is on the outer surface of the rung 10.

By way of example, we have employed hydraulic force in effecting the operations of FIGURES 5 to 9. We have used a rung having an outer diameter of 1¼ inches, .050 of an inch thickness of wall 10b between serrations, having a weight of about .238 of a pound, and providing a mounted width of ladder of between 16¼ and 16⅞ inches. A rung spacing of 12 inches was used in producing a 40 foot, two-section ladder. Each side rail weighed about .60 of a pound and was of the indicated modified channel shape. The metal comprised a 6061 aluminum alloy having a T-61 temper. The total weight of the ladder was 64 pounds.

Under a torque application of 2850 inch pounds of twist, the joint was retained, but failure eventually occurred through the section of the rung at 2850 inch pounds. This compares with torque tests applied to the earlier-mentioned types of rung and rail joints, where torque applied until failure varied between 150 inch pounds for an expanded and flared type, 1272 inch pounds for an upset-expanded and staked type, 2760 inch pounds for the rather expensive, swaged, riveted, gusset plate type, and 960 inch pounds for a flared, expanded and staked type. It may be noted that superiority was shown even with respect to the previously-considered superior swaged, riveted and gusset plate type. In addition, our construction is greatly simplified both in the parts employed and in their assembly, so that a better joint is attained with a simplified procedure and with much less expense of parts involved. Racking qualities were far superior in our construction.

Thus, in carrying out our procedure, an assembly is provided which comprises the end portion of a relatively thin-wall or tubular metal rung member or part 10. At least one aligned side rail 12 is pierced to provide the open portion 12b for receiving the rung end portion. The ferrule or banding part 11 is interposed between the open portion of the side rail 12 and the outer periphery or circumference of an end portion of the rung 10. As indicated earlier, the ferrule 11 is provided with an inner diameter that is slightly smaller than the outer diameter of the serrations 10a of the rung 10. The ferrule 11 is also provided with an outer diameter that is slightly greater than the inner diameter of the bounding edge wall 12b of the open portion of the side rail 12. This insures a slide-on frictional fit or preliminary mounting of the ferrule 11 on the rung 10 and of the side rail 12 on the ferrule 11 (see FIGURES 3 to 5).

In the joint-forming operation, we have been able to simultaneously accomplish a dual unitizing operation, although it will be appreciated that it may be accomplished on one end only of the rung, if so desired.

After the assembly has been accomplished with each ferrule 11 associated with an aligned rung end portion and side rail opening, the next step of our procedure is to end-swage or endwise-inwardly compress the ferrule 11 and essentially, cause a flow of the ferrule metal in major quantity radially-outwardly into compression engagement within and in a side-rimming flow along both sides of the associated wall edge portion 12b of the opening in the side rail 12. In addition, ferrule metal flows slightly radially-inwardly in a compression-grooving action into the wall or upon the outer surface of the end portion of the rung 10 to provide a groove or valley therein. This in-movement is minor compared to the out-movement or flow of the metal, but is sufficient to provide a secure aligned-interlatching or interfitting tongue and groove arrangement between the intermediate fillet metal 11 and the end portion of the rung member 10.

The end-force application on the ferrule 11 is sufficient to provide a radial flow of its metal to, as shown in FIGURE 10, produce a major flow of metal radially-outwardly in a side-rail-expanding manner between the rung 10 and the side rail 12. This latter out-flow provides a latching connection between the ferrule 11 and the side rail 12, also of somewhat of a tongue and groove type that is supported on opposite sides of the side rail 12 by radially-outwardly-projecting rims or flanges of end ring halves 11′a and 11′b.

At the same time, the projecting teeth or pips 10a of the serrated outer surface of the rung 10 become, as shown in FIGURE 10A, fully sealed within and in a complementary manner along the ferrule 11′ that is thus shaped or formed. In a like manner, the grooved portions 12a of the open portions in the side rail 12 become complementary with or are filled-in with metal flowing towards or from the outer periphery of the ferrule 11. The complete joint, as shown in FIGURE 10, is thus of a compression-tension type, in the sense that the ferrule metal 11′ is under compression between the members 10 and 12, the portion 10c is under tension, and the portion 12b is under outward stretch. It will be noted that the width of the ferrule metal or its abutment base along the valley 10c is of greater extent than the width of the apex of ferrule metal that is adjacent to the edge wall 12b.

What we claim is:

1. In making a secure stress and strain-resistant ladder joint between a rung part and a rail part, the steps of providing a hollow rung part with at least one end portion of substantially constant wall dimension lengthwise thereof and with circumferentially-spaced radial offsetting on its outer wall, providing a rail part with a longitudinal side wall having at least one open portion therethrough of larger diameter than the one end portion of the rung part and defined by an enclosing peripheral edge wall having circumferentially-spaced radial offsetting thereon, aligning the rung part substantially perpendicular to and with its one end portion in alignment with the open portion of the rail part, positioning a metal ferrule with its inner wall over the one end portion of the rung part and with its outer wall within the enclosing peripheral edge wall of the rail part, aligning the ferrule on a transverse plane extending across the one end portion of the rung part and along the peripheral edge wall of the rail part, flowing metal of the ferrule part radially-outwardly into tight engagement with the peripheral edge wall and the radial offsetting of the rail part and along the opposite sides of the peripheral edge wall, and substantially simultaneously flowing metal of the ferrule part into tight engagement with the one end portion of the rung part and its radial offsetting and radially-inwardly into and deforming an annular latching valley in the wall of the one end portion along such transverse plane to provide a secure and shock-resistant joint between the rail part and the rung part.

2. In making a secure stress and strain-resistant ladder joint between a rung part and a rail part as defined in claim 1 wherein, the radial offsetting of the enclosing peripheral edge wall of the rail part has a greater peripheral spacing than the radial offsetting of the outer wall of the rung part and wherein, the flow of metal of the ferrule part is controlled to position a major portion of the thickness of the metal of the ferrule radially-outwardly from the wall of the one end portion of the rung part, and to position a minor portion of the thickness of the metal of the ferrule within the latching valley and radially-inwardly of the wall of the one end portion of the rung part.

3. In making a secure stress and strain-resistant ladder joint between a rung part and a rail part, the steps of providing a hollow rung part with at least one end portion of substantially constant wall dimension lengthwise thereof and with radial circumferentially-spaced offsetting on its outer wall, providing a rail part with a longitudinal side wall having at least one open portion therethrough of larger diameter than the one end portion of the rung part and defined by an enclosing peripheral edge wall having radial circumferentially-spaced offsetting thereon, aligning the rung part substantially perpendicular to and with its one end portion in alignment with the open portion of the rail part, positioning a metal ferrule with its inner wall over the one end portion of the rung part and with its outer wall within the enclosing peripheral edge wall of the rail part, aligning the ferrule on a transverse plane extending across the one end portion of the rung part and along the enclosing peripheral edge wall of the rail part, and applying opposed compression force on the ferrule lengthwise of the one end portion of the rung part and flowing metal of the ferrule part radially-outwardly into tight engagement with the peripheral edge wall and the radial offsetting of the rail part and along opposite sides of the peripheral edge wall, while flowing metal of the ferrule part into tight engagement with the one end portion of the rung part and its radial offsetting and radially-inwardly into and deforming an annular latching valley in the wall of the one end portion along such transverse plane to provide a secure and shock-resistant joint between the rail part and the rung part.

4. In making a secure stress and strain-resistant ladder joint between a rung part and a rail part as defined in claim 3 wherein, the flow of the metal of the ferrule part is controlled to provide it with a greater width along the one end portion of the rung part than along the peripheral edge wall of the rail part.

5. In making a secure stress and strain-resistant ladder joint between a rung part and a rail part as defined in claim 3 wherein, the compression and flow of the metal of the ferrule part is effected by relative endwise movement of a pair of opposed dies that substantially confine the ferrule during the completion of the operation, and a pilot die is simultaneously moved endwise within the one end portion of the rung part to limit the radial-inward flow of the metal of the ferrule part and the deforming of the wall of the one end portion of the rung part.

6. In making a secure stress and strain-resistant ladder joint between a substantially rigid rung part and a spaced pair of substantially rigid rail parts, the steps of providing a hollow rung part with a pair of opposite end portions of substantially constant wall dimension lengthwise thereof and with radial circumferentially-spaced offsets on their outer walls; providing a pair of spaced-apart rail parts, each with a longitudinal side wall having at least one open portion therethrough in alignment with the open portion of the other rail part, and with each open portion of larger diameter than the opposite end portions of the rung part and defined by an enclosing peripheral edge wall having radial circumferentially-spaced offsets thereon; aligning the rung part substantially perpendicular to and with its opposed end portions in alignment with the open portions of the rail parts, providing a pair of metal ferrules, positioning one of the metal ferrules with its inner wall over one end portion of the rung part and with its outer wall within the enclosing peripheral edge wall of one rail part, positioning the other of the metal ferrules in similar manner over the other end portion of the rung part and within the enclosing peripheral edge wall of the other rail part, aligning each ferrule on a transverse plane extending across the associated end portion of the rung part and along the peripheral edge wall of the associated rail part, simultaneously relatively moving opposed die jaws on each end portion of the rung part towards each other and applying opposed compression force on each ferrule lengthwise of the associated end portion of the rung part and flowing metal of each ferrule part radially-outwardly into tight engagement with the peripheral edge wall and the radial offsets of the associated rail part and along opposite sides of the peripheral edge, while flowing metal of each ferrule part into tight engagement with the associated end portion and the radial offsets of the rung part and radially-inwardly into and deforming an annular latching valley on the wall of the associated end portion of the rung part along such transverse plane to simultaneously provide secure joints between the opposed end portions of the rung part and the pair of rail parts, and controlling the radial-inward deforming of the walls of the opposite end portions of the rung part during the application of the compression force on the ferrules by positioning pilot dies within the opposite end portions.

References Cited in the file of this patent

UNITED STATES PATENTS

| | | |
|---|---|---|
| 1,954,545 | Uline | Apr. 10, 1934 |
| 2,007,703 | Bertschi | July 9, 1935 |
| 2,171,863 | Pirsch | Sept. 5, 1939 |
| 2,293,239 | Brasseur | Aug. 18, 1942 |
| 2,635,717 | Albrecht et al. | Apr. 21, 1953 |
| 2,667,688 | Winter | Feb. 2, 1954 |
| 2,804,679 | Tracy | Sept. 3, 1957 |
| 2,842,842 | McCarthy | July 15, 1958 |

FOREIGN PATENTS

| | | |
|---|---|---|
| 244,542 | Italy | Jan. 30, 1926 |
| 267,451 | Switzerland | June 16, 1950 |